(12) United States Patent  
Wang et al.

(10) Patent No.: US 12,490,957 B2  
(45) Date of Patent: Dec. 9, 2025

(54) ULTRASOUND IMAGING METHOD AND SYSTEM, AND STORAGE MEDIUM

(71) Applicant: GE Precision Healthcare LLC, Waukesha, WI (US)

(72) Inventors: Siying Wang, Wuxi (CN); Morgan Jakobsen, Horten (NO); Le Xu, Wuxi (CN)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/893,769

(22) Filed: Sep. 23, 2024

(65) Prior Publication Data

US 2025/0099076 A1   Mar. 27, 2025

(30) Foreign Application Priority Data

Sep. 27, 2023 (CN) .......................... 202311266224.2

(51) Int. Cl.
  *A61B 8/00* (2006.01)
  *A61B 8/08* (2006.01)

(52) U.S. Cl.
  CPC ............ *A61B 8/463* (2013.01); *A61B 8/0883* (2013.01); *A61B 8/464* (2013.01); *A61B 8/465* (2013.01); *A61B 8/469* (2013.01)

(58) Field of Classification Search
  CPC ....... A61B 8/463; A61B 8/0883; A61B 8/464; A61B 8/465; A61B 8/469; A61B 8/461; A61B 8/54; A61B 8/467; A61B 8/52; A61B 8/5223; G16H 30/40; G16H 50/20; G16H 50/30
  See application file for complete search history.

(56) References Cited

U.S. PATENT DOCUMENTS

| | | | | |
|---|---|---|---|---|
| 8,221,322 | B2 * | 7/2012 | Wang | G06T 5/70 600/443 |
| 11,147,635 | B1 * | 10/2021 | Sganga | G16H 40/63 |
| 11,457,983 | B1 * | 10/2022 | Roh | A61B 34/25 |
| 2004/0097805 | A1 * | 5/2004 | Verard | A61B 34/20 600/428 |
| 2004/0097806 | A1 * | 5/2004 | Hunter | A61B 6/463 600/434 |
| 2007/0032726 | A1 * | 2/2007 | Osaka | A61B 8/08 600/459 |
| 2008/0146932 | A1 * | 6/2008 | Chalana | A61B 8/0866 600/447 |

(Continued)

*Primary Examiner* — Sanjay Cattungal

(57) ABSTRACT

An ultrasound imaging system that performs real-time ultrasound imaging of tissue to be imaged, generates a series of ultrasound images and parameter measurement results; displays a decision tree regarding the tissue to be imaged, the decision tree comprising nodes, the nodes comprising a root node, a plurality of internal nodes and a plurality of leaf nodes, the root node linking separately to each of the plurality of leaf nodes by means of a predetermined number of internal nodes to form a plurality of links, and each of the plurality of leaf nodes corresponding to a diagnostic result respectively; automatically matches the parameter measurement results with each of the nodes according to the at least one decision condition; and automatically updates the display of the decision tree according to the results of the automatic matching.

21 Claims, 9 Drawing Sheets

(56) References Cited

U.S. PATENT DOCUMENTS

| | | | |
|---|---|---|---|
| 2010/0030061 A1* | 2/2010 | Canfield | A61N 1/372 |
| | | | 600/413 |
| 2021/0093301 A1* | 4/2021 | Wang | A61B 8/463 |
| 2021/0319914 A1* | 10/2021 | Roh | G16H 40/67 |
| 2022/0032089 A1* | 2/2022 | Curra | G01S 7/2922 |
| 2023/0181159 A1* | 6/2023 | Kremsl | G06F 3/0346 |
| | | | 600/459 |
| 2024/0260946 A1* | 8/2024 | Vega Romero | A61B 8/4245 |
| 2025/0099076 A1* | 3/2025 | Wang | G16H 50/30 |

* cited by examiner

ULTRASOUND IMAGING METHOD AND SYSTEM, AND STORAGE MEDIUM

CROSS-REFERENCE TO RELATED APPLICATION

This application claim priority to Chinese Patent Application No. 202311266224.2, which was file on Sep. 27, 2023 at the Chinese Patent Office. The entire contents of the above-listed application are incorporated by reference herein in their entirety.

TECHNICAL FIELD

Embodiments of the present application relate to the technical field of medical apparatuses, and relate in particular to an ultrasound imaging method and system and a storage medium.

BACKGROUND

With the development of ultrasound imaging technology, ultrasound imaging technology is more and more widely applied in assisted diagnosis. For example, ultrasonography is performed on a patient's thyroid, heart, and other organs, and physicians use ultrasound images as well as parameter measurement results to diagnose functions and lesions of the organs.

It should be noted that the above introduction of the background is only for the convenience of clearly and completely describing the technical solutions of the present application, and for the convenience of understanding for those skilled in the art.

SUMMARY

In medical diagnosis, certain lesions may be discovered directly by observing ultrasound images. Some lesions, however, require complex measurements and decision-making before they can be discovered, and due to the complexity of the diagnostic process, physicians are prone to making errors.

For example, for the diagnosis of left ventricular diastolic function (LVDF), American Society of Echocardiography and European Association of Cardiovascular Imaging (ASE/EACVI) guidelines have clearly provided guidance on the diagnostic process with regard to LVDF. However, due to the complexity of this diagnostic process, physicians will need to comprehensively navigate through ultrasound images and measurement results of the heart and engage in a complex decision-making process in their minds to be able to arrive at the correct diagnostic conclusion. As a result, some physicians are reluctant to perform the complete diagnostic process according to the guidelines and only skim over a few key parameters, e.g., not proceeding with the diagnosis of LVDF when they see that mitral valve inflow is shown to be normal. However, this can lead to the misdiagnosis of grade II diastolic dysfunction or even to the misdiagnosis of heart failure with preserved ejection fraction (HFpEF), among other situations.

In response to at least one among the above technical problems, embodiments of the present application provide an ultrasound imaging method and system, and a storage medium so as to aid physicians in obtaining required ultrasound images and reduce the diagnostic burden of the physicians.

According to a first aspect of the embodiments of the present application, an ultrasound imaging method is provided. The method comprises:

Performing real-time ultrasound imaging of tissue to be imaged, and generating a series of ultrasound images and parameter measurement results;

displaying a decision tree regarding the tissue to be imaged, the decision tree comprising nodes, the nodes comprising a root node, a plurality of internal nodes and a plurality of leaf nodes, the root node and each internal node comprising at least one decision condition, respectively, the root node linking separately to each of the plurality of leaf nodes by means of a predetermined number of internal nodes to form a plurality of links, the predetermined number being determined by the decision conditions, and each of the plurality of leaf nodes corresponding to a diagnostic result, respectively;

Automatically matching the parameter measurement results with each of the nodes according to the at least one decision condition; and Automatically updating the display of the decision tree according to the results of the automatic matching.

According to a second aspect of the embodiments of the present application, an ultrasound imaging system is provided. The system comprises: a processor, the processor executing the steps of the method described in the embodiments of the first aspect.

According to a third aspect of the embodiments of the present application, a non-transitory computer-readable storage medium for storing a computer program is provided, and, when executed by a computer, the computer program causes the computer to execute the method described in the embodiments of the first aspect.

One of the beneficial effects of the embodiments of the present application is that: automatically matching according to ultrasound images and parameter measurement results and decision conditions of a decision tree, and displaying the matching results, can aid physicians in performing ultrasound scans or measurements, and reduce the diagnostic burden on the physicians.

With reference to the following description and drawings, specific implementations of the embodiments of the present application are disclosed in detail, and the means by which the principles of the embodiments of the present application can be employed are illustrated. It should be understood that the embodiments of the present application are therefore not limited in scope. Within the scope of the spirit and clauses of the appended claims, the embodiments of the present application include many changes, modifications, and equivalents.

BRIEF DESCRIPTION OF THE DRAWINGS

The included drawings are used to provide further understanding of the embodiments of the present application, which constitute a part of the description and are used to illustrate the implementations of the present application and explain the principles of the present application together with textual description. Evidently, the drawings in the following description are merely some embodiments of the present application, and a person of ordinary skill in the art may obtain other implementations according to the drawings without involving inventive effort. In the drawings.

DETAILED DESCRIPTION

The foregoing and other features of the embodiments of the present application will become apparent from the following description with reference to the drawings. In the description and drawings, specific implementations of the present application are disclosed in detail, and part of the implementations in which the principles of the embodiments of the present application may be employed are indicated. It should be understood that the present application is not limited to the described implementations. On the contrary, the embodiments of the present application include all modifications, variations, and equivalents which fall within the scope of the appended claims.

In the embodiments of the present application, the terms "first" and "second" etc., are used to distinguish different elements, but do not represent a spatial arrangement or temporal order, etc., of these elements, and these elements should not be limited by these terms. The term "and/or" includes any and all combinations of one or more associated listed terms. The terms "comprise", "include", "have", etc., refer to the presence of described features, elements, components, or assemblies, but do not exclude the presence or addition of one or more other features, elements, components, or assemblies.

In the embodiments of the present application, the singular forms "a" and "the", etc., include plural forms, and should be broadly construed as "a type of" or "a class of" rather than being limited to the meaning of "one". Furthermore, the term "the" should be construed as including both the singular and plural forms, unless otherwise specified in the context. In addition, the term "according to" should be construed as "at least in part according to . . . " and the term "on the basis of" should be construed as "at least in part on the basis of . . . ", unless otherwise specified in the context.

The features described and/or illustrated for one implementation may be used in one or more other implementations in the same or similar manner, be combined with features in other embodiments, or replace features in other implementations. The term "include/comprise" when used herein refers to the presence of features, integrated components, steps, or assemblies, but does not preclude the presence or addition of one or more other features, integrated components, steps, or assemblies.

Figure 1:
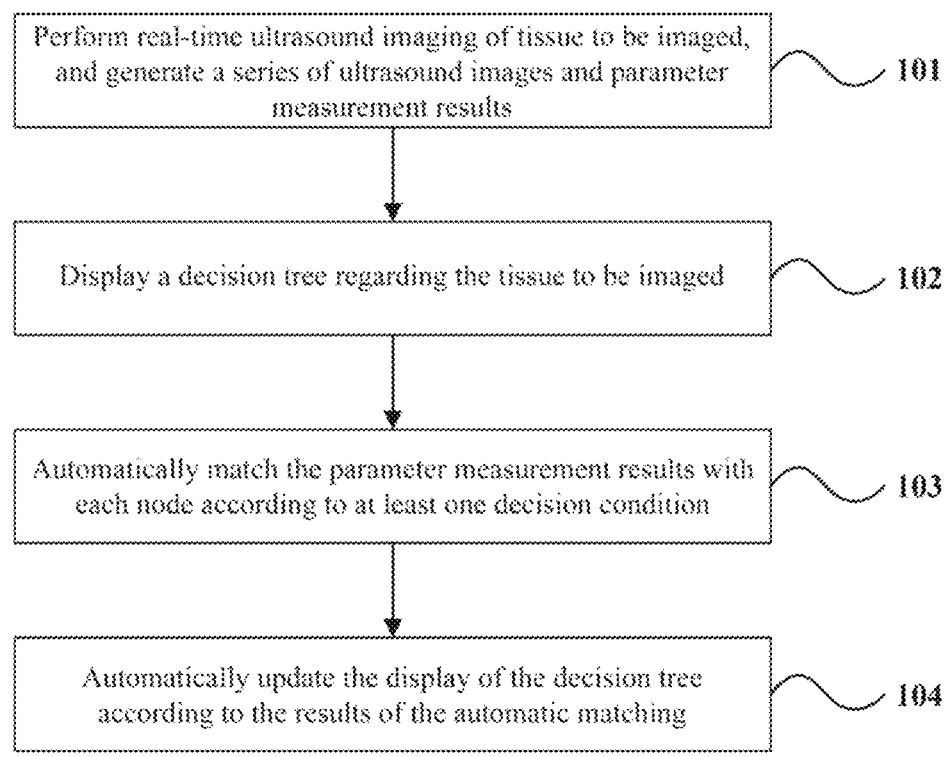
FIG. 1 is a schematic diagram of an ultrasound imaging method according to an embodiment of the present application.

Embodiments of the present application provide an ultrasound imaging method. FIG. 1 is a schematic diagram of an ultrasound imaging method according to an embodiment of the present application. As shown in FIG. 1, the method includes:

101: Performing real-time ultrasound imaging of tissue to be imaged, and generating a series of ultrasound images and parameter measurement results;

102: Displaying a decision tree regarding the tissue to be imaged, the decision tree comprising nodes, the nodes comprising a root node, a plurality of internal nodes and a plurality of leaf nodes, the root node and each internal node comprising at least one decision condition, respectively, the root node linking separately to each of the plurality of leaf nodes by means of a predetermined number of internal nodes to form a plurality of links, the predetermined number being determined by the decision conditions, and each of the plurality of leaf nodes corresponding to a diagnostic result, respectively;

103: Automatically matching the parameter measurement results with each of the nodes according to the at least one decision condition; and 104: Automatically updating the display of the decision tree according to the results of the automatic matching.

Thus, automatically matching according to the ultrasound images and parameter measurement results and the decision conditions of the decision tree and displaying the matching results can aid physicians in performing ultrasound scans or measurements and reduce the diagnostic burden of the physicians. In conventional ultrasound diagnosis processes, a physician first obtains a series of ultrasound images from an ultrasound scan, then takes a series of measurements of these images, and then manually compares the same with a diagnostic basis. Since a series of ultrasound images and corresponding measurements may serve many different purposes, e.g., targeting different tissues to be imaged or different sites of interest in the same tissue to be imaged, when physicians need to compare images and measurements for a particular diagnosis (e.g., LVDF), the physicians need to exclude irrelevant images and measurements from a large number of images and measurements and subsequently manually compare the same with a decision tree. In contrast, in the above embodiment of the present application, the decision tree is visually displayed and the decision conditions contained therein are configurable. Such configurability includes automatic matching with existing data and automatic updating of the display according to the matching. The automatic matching process eliminates the need for physicians to select and compare data one-by-one from a large amount of redundant data, while the automatic updating enable physicians to visually understand the decision progress of a decision tree. Ultimately, the diagnostic burden is greatly reduced.

In embodiments of the present application, an ultrasound apparatus is utilized to scan the tissue to be imaged, thus obtaining a series of ultrasound images and parameter measurement results, and additionally, parameter measurements may be performed manually by an operator of the ultrasound scan, or a machine may automatically perform measurements by means of, for example, automatic measurement means such as image recognition. The embodiments of the present application do not limit how ultrasound images and parameter measurement results are obtained, and relevant technology can be referred to for specific implementations.

Alternatively, operation 101 may not be necessary, i.e., the ultrasound images and parameter measurement results may be acquired and stored in advance, and operation 101 may be replaced with "acquiring a series of ultrasound images and parameter measurement results of the tissue to be imaged" or "reading a series of ultrasound images and parameter measurement results of the tissue to be imaged".

Figure 2:
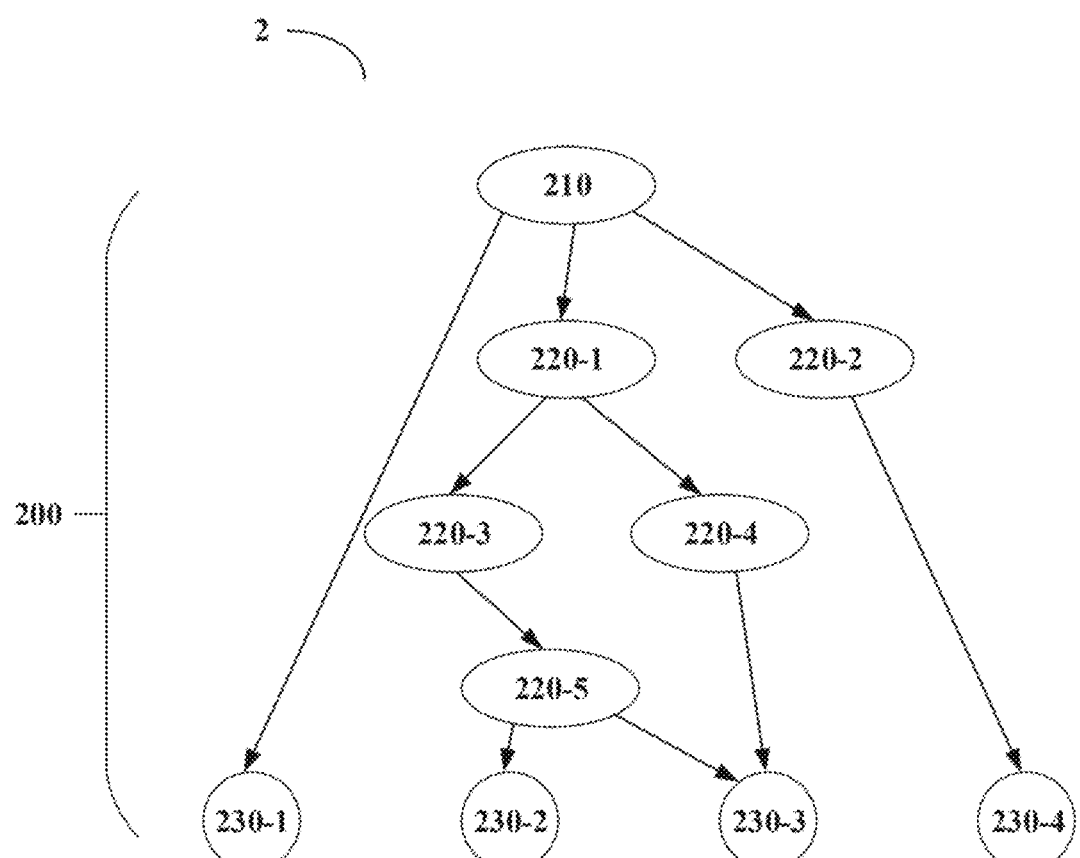
FIG. 2 is a schematic diagram of a decision tree of an embodiment of the present application.

FIG. 2 is a schematic diagram of a decision tree of an embodiment of the present application.

As shown in FIG. 2, a decision tree 2 includes nodes 200, the nodes 200 include a root node 210, internal nodes 220 (e.g., internal nodes 220-1 to 220-5) and leaf nodes 230 (e.g., leaf nodes 230-1 to 230-4), and the root node 210 links to the leaf nodes 230 by means of a predetermined number of internal nodes 220 to form links.

In embodiments of the present application, the decision tree is related to the diagnostic process of the tissue to be imaged. The root node 210 and each internal node 220 respectively include at least one decision condition. The decision conditions are related to information contained in the ultrasound images and/or the parameter measurement results. Each leaf node 230 corresponds to a diagnostic result, and the decision conditions determine the direction of the link, i.e., each decision condition determines according to which links each node corresponding thereto travels until the node is linked to the final leaf node 230, and the number of internal nodes 220 contained in each link is determined by the decision conditions.

A link may contain zero internal nodes 220. For example, as shown in FIG. 2, there is a direct link from the root node 210 to the leaf node 230-1, i.e., the decision condition contained in the root node 210 allows direct linking from the root node 210 to the leaf node 230-1.

A link may contain one or more internal nodes 220. For example, as shown in FIG. 2, the root node 210 links to the leaf node 230-4 by means of the internal node 220-2, i.e., the decision condition contained in the root node 210 allows linking from the root node 210 to the internal node 220-2, and the decision condition contained in the internal node 220-2 allows linking from the internal node 220-2 to the leaf node 230-4. Alternatively, the root node 210 links to the leaf node 230-3 by means of the internal nodes 220-1, 220-3 and 220-5, i.e., the decision condition contained in the root node 210 allows linking from the root node 210 to the internal node 220-1, the decision condition contained in the internal node 220-1 allows linking from the internal node 220-1 to the internal node 220-3, the decision condition contained in the internal node 220-3 allows linking from the internal node 220-3 to the internal node 220-5, and the decision condition contained in the internal node 220-5 allows linking from the internal node 220-5 to the leaf node 230-3.

In some embodiments, the tissue to be imaged includes, for example, a heart, and the diagnostic result is, for example, related to left ventricular diastolic function. As a result, a decision tree for left ventricular diastolic function can be used to aid physicians in carrying out ultrasound scans and measurements, thereby reducing the diagnostic burden on the physicians.

For ease of illustration, the ultrasound imaging method of the embodiments of the present application is described below by using an ultrasound scan of the heart and a decision tree for left ventricle diastolic function as an example. However, it should be understood by a person skilled in the art that the method of the embodiments of the present application can be applied to ultrasound scans of any organ and corresponding decision trees.

In some embodiments, in operation 104, at least one node that matches the parameter measurement results is highlighted in a first manner; and/or a node to be matched is highlighted in a second manner, wherein the node to be matched links to an end node among the at least one node and does not match the parameter measurement results. Specifically, in some embodiments, at least one node matching the parameter measurement results may be highlighted by using only the first manner. With such a means for display, a physician is able to quickly and accurately see from a decision tree that a current direction of a link and measurements that have been completed, thereby increasing ultrasonography confidence. In other embodiments, the node to be matched may be highlighted by using only the second manner. It can be understood that the so-called node to be matched can be understood as a node in a decision tree for which a link currently being matched is stalled due to missing data. Such nodes are in fact nodes that are directly required by the physician to perform imaging and/or measurement operations, and the above embodiments are configured in such a way so as to visually and succinctly inform the physician of the operations that need to be performed. In other embodiments, nodes that have been matched and to be matched may be highlighted in the first manner and the second manner respectively, and accordingly, combine the advantages described above herein.

In embodiments of the present application, a matched node indicates that all of the decision conditions contained within the node are satisfied, while a node to be matched indicates that at least one among the decision conditions contained within the node is not satisfied, and the node to be matched is a blocked node in a current link, said node being linked to an end node of at least one previously matched node.

Figure 3:
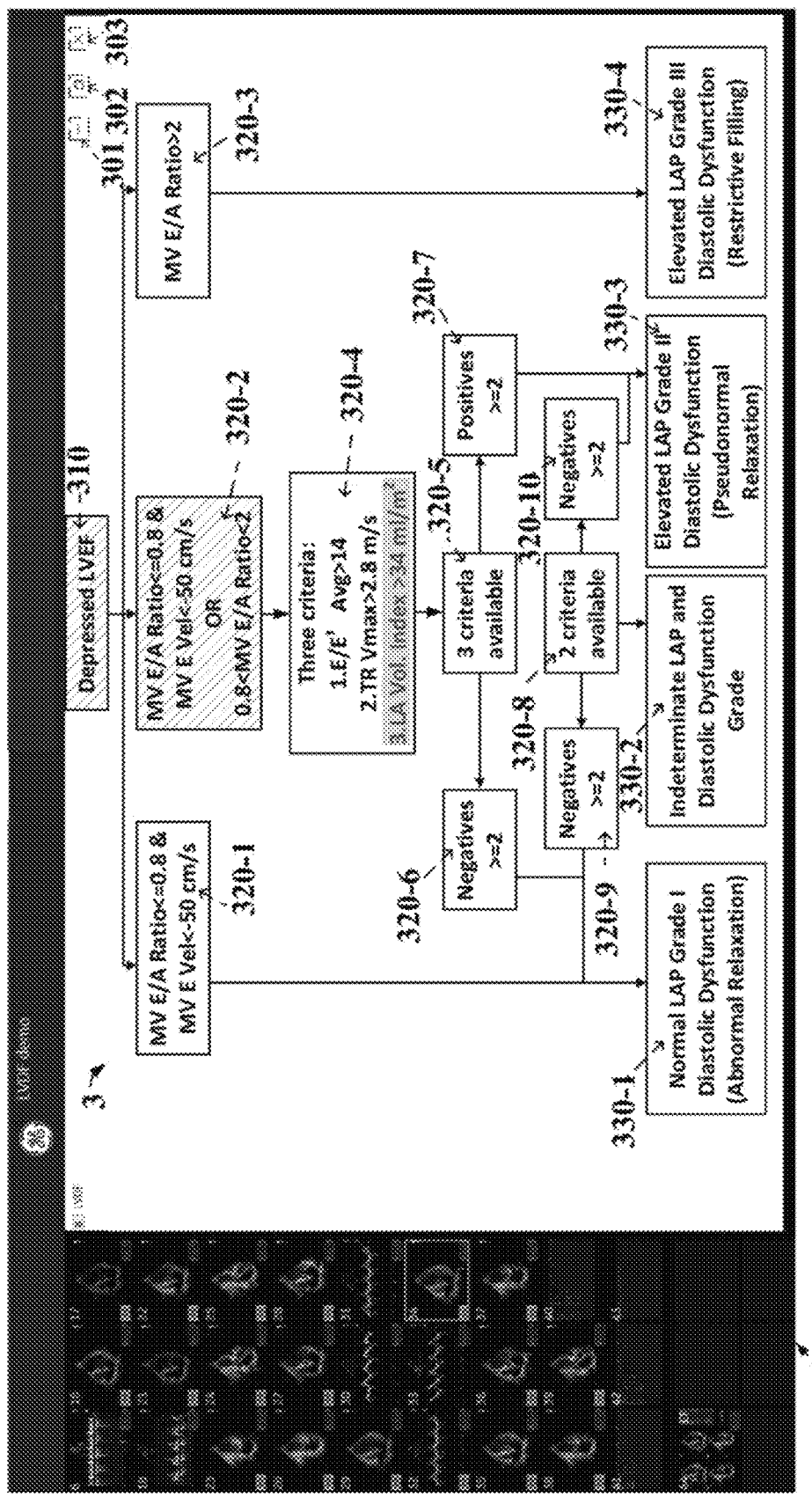
FIG. 3 is a schematic diagram of aiding a physician in performing an ultrasound scan by utilizing a decision tree for left ventricle diastolic function.

FIG. 3 is a schematic diagram of aiding a physician in performing an ultrasound scan by utilizing a decision tree for left ventricle diastolic function.

FIG. 3 illustrates a portion of a decision tree for left ventricular diastolic function (LVDF), and for ease of illustration, the decision tree shown in FIG. 3 will hereinafter be referred to as an "LVDF decision tree". As shown in FIG. 3, the LVDF decision tree 3 includes a root node 310, internal nodes 320-1 to 320-10, and leaf nodes 330-1 to 330-4. The root node 310 and the internal nodes 320-1 to 320-10 all contain at least one decision condition. The decision condition contained in the root node 310 may be, for example, "whether or not the parameter MV E/A Ratio and the parameter MV E Vel have been measured"; if said parameters have been measured, it indicates that the root node 310 is matched, and if not, it indicates that the root node 310 is to be matched. In another example, the decision condition contained in the internal node 320-4 may be at least one among "whether parameters E/E' Avg, TR Vmax and LA Vol. Index have been measured", "1. E/E' Avg>14," "2. TR Vmax>2.8 m/s" and "3. LA Vol. Index>34 ml/m$^2$," and if the above parameters have been measured, then this indicates that the internal node 320-4 is matched; or, furthermore, a comparison of the magnitude of each of the parameters with a predetermined threshold is carried out, and if at least one of the parameters satisfies a condition equation, then this indicates that the internal node 320-4 is matched. Otherwise, for example, if there are unmeasured parameters, this indicates that the internal node 320-4 is to be matched.

In the above example, the first manner of highlighting is, for example, to fill the matching nodes with a color that is different from the color of the other nodes, e.g., in FIG. 3, none of the nodes are filled with a color before auto-matching is initiated, and after auto-matching is initiated, the matched root node 310 and the internal node 320-2 are filled with a color so as to be differentiated from the other nodes, the other nodes including nodes to be matched, non-matching nodes, and unmatched nodes.

In an embodiment of the present application, a non-matching node is a node other than a matching node among superior nodes of nodes to be matched, e.g., as shown in FIG. 3, the next-hop node of the root node 310 includes three internal nodes, which are internal node 320-1, internal node 320-2, and internal node 320-3 respectively, and the next-hop node of the internal node 320-2 is the internal node 320-4. In this example, the node to be matched is the internal node 320-4, and the superior nodes thereof include the internal node 320-1, internal node 320-2, and internal node 320-3 and root node 310, and among these nodes, the internal node 320-2 and the root node 310 are matched nodes, while the internal node 320-1 and the internal node 320-3 are non-matching nodes.

In an embodiment of the present application, the unmatched nodes are all subordinate nodes of a node to be matched, and in the decision tree as shown in FIG. 3, the node to be matched is the internal node 320-4, and the unmatched nodes are all of the subordinate nodes of the internal node 320-4, i.e., the internal nodes 320-5 to 320-10 and the leaf nodes 330-1 to 330-4.

In the above example, the second manner of highlighting is, for example, to partially highlight a node to be matched, e.g., in FIG. 3, a plurality of pieces of textual information is displayed in the internal node 230-4, wherein the textual information may be decision conditions, and a portion of the textual information may be highlighted, e.g., a highlighted decision condition indicates that the decision condition has been successfully matched, or a highlighted decision condition indicates that the decision condition has not yet been successfully matched, or vice versa.

In embodiments of the present application, matched nodes or nodes to be matched may also be displayed by using highlighting methods such as illuminated display, bold display, character jumping, and the like, so as to display the foregoing nodes differently from other nodes to thereby provide a prompt to a user.

Alternatively, the other nodes may be displayed in a non-highlighted manner thereby enabling the matched nodes or the nodes to be matched to be prominently displayed, e.g., by making the other nodes less visible, for example semi-transparent or transparent, the matched nodes or the nodes to be matched are more prominently displayed. Embodiments of the present application do not limit the manner of highlighting.

In some embodiments, in operation 104, an alert message regarding the nodes to be matched may also be displayed, the alert message including information regarding parameter measurements required to match with the nodes to be matched.

Figure 4:
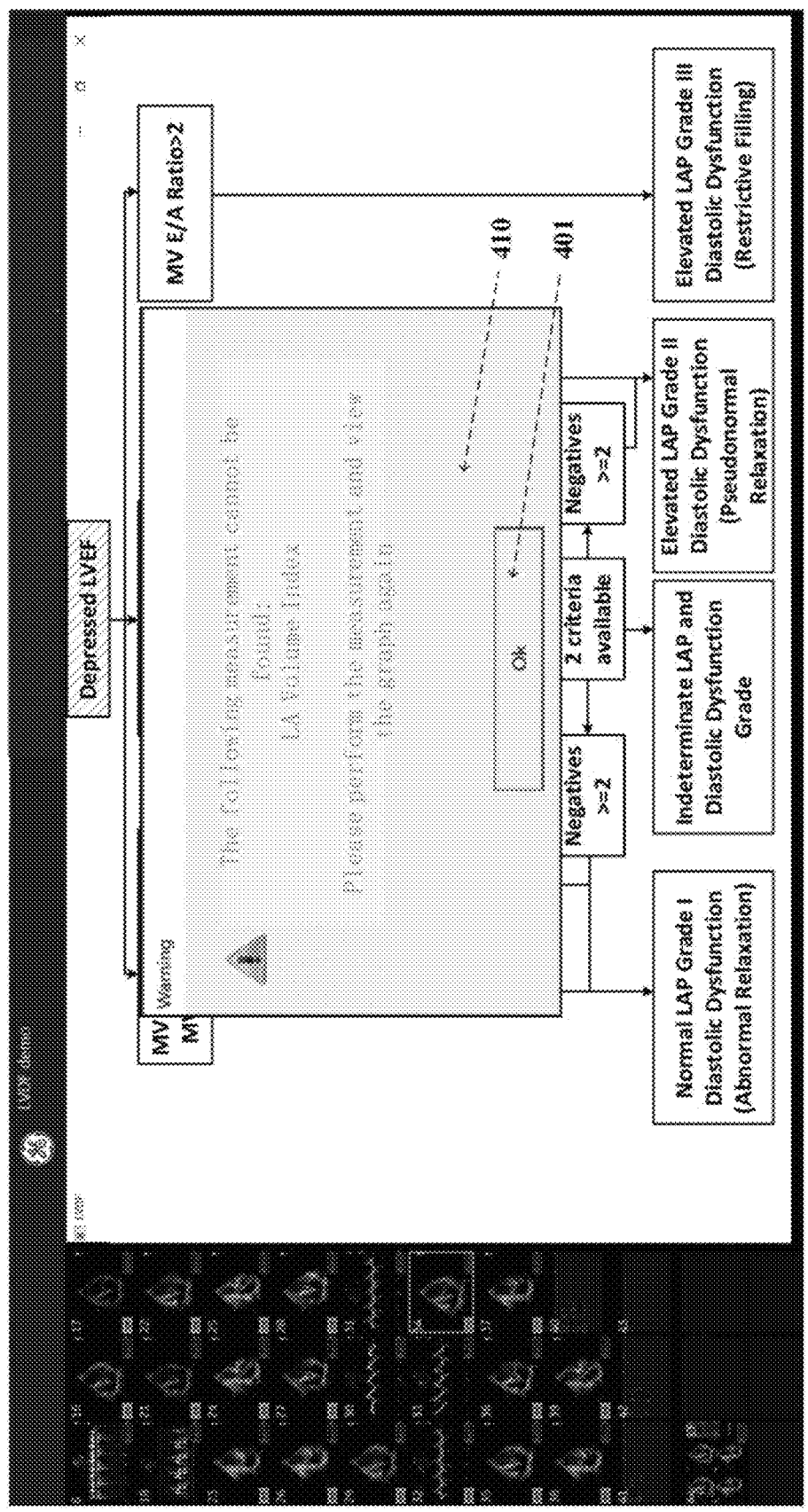
FIG. 4 is another schematic diagram of aiding a physician in performing an ultrasound scan by utilizing a decision tree for left ventricle diastolic function.

FIG. 4 is another schematic diagram of aiding a physician in performing an ultrasound scan by utilizing a decision tree for left ventricle diastolic function.

For example, as shown in FIG. 4, parameters to be measured can be displayed in the form of a pop-up window 410.

In the above example, as shown in FIG. 3, decision conditions contained in the internal node 230-4 include "whether parameter E/E' Avg, parameter TR Vmax, and parameter LA Vol. Index have been measured", and if the parameter LA Vol. Index has not yet been measured, as shown in FIG. 3, a condition equation corresponding to the parameter can be highlighted, or as shown in FIG. 4, an alert message that parameter LA Vol. Index needs to be measured can be prompted in the pop-up window, so as to aid a physician in measuring the corresponding parameter.

Figure 5:
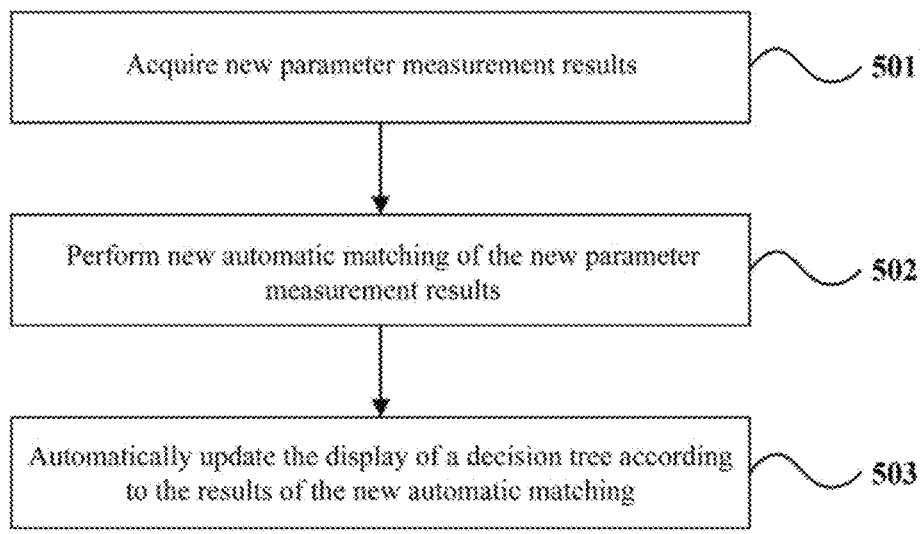
FIG. 5 is another schematic diagram of an ultrasound imaging method according to an embodiment of the present application.

FIG. 5 is another schematic diagram of an ultrasound imaging method according to an embodiment of the present application.

In some embodiments, as shown in FIG. 5, the method may further include:
  501: Acquiring new parameter measurement results;
  502: Performing new automatic matching of the new parameter measurement results; and
  503: Automatically updating the display of the decision tree according to the results of the new automatic matching.

The new parameter measurement results may be obtained by a physician performing targeted ultrasound imaging and measurements after being prompted by the matching results in the above embodiments of the present application. In the embodiment illustrated in FIG. 5,
  in the event that the storage of the new parameter measurement results is detected, decision tree matching is restarted by using the new parameter measurement results, e.g., all decision conditions can be re-matched by starting again from the root node, or decision conditions contained in the node to be matched and decision conditions in nodes thereafter can be matched starting from the node to be matched, which is not limited by embodiments of the present application. The above process can be automated. Such configuration can further simplify the work of physicians and increase work efficiency. During an actual scan and examination process, imaging and measurement operations may not be completed in one step. The above embodiments of the present application can ensure that a physician constantly receives automated and accurate prompts during the operation process, and real-time updating of the decision tree can provide prompt guidance to the physician.

Figure 6:
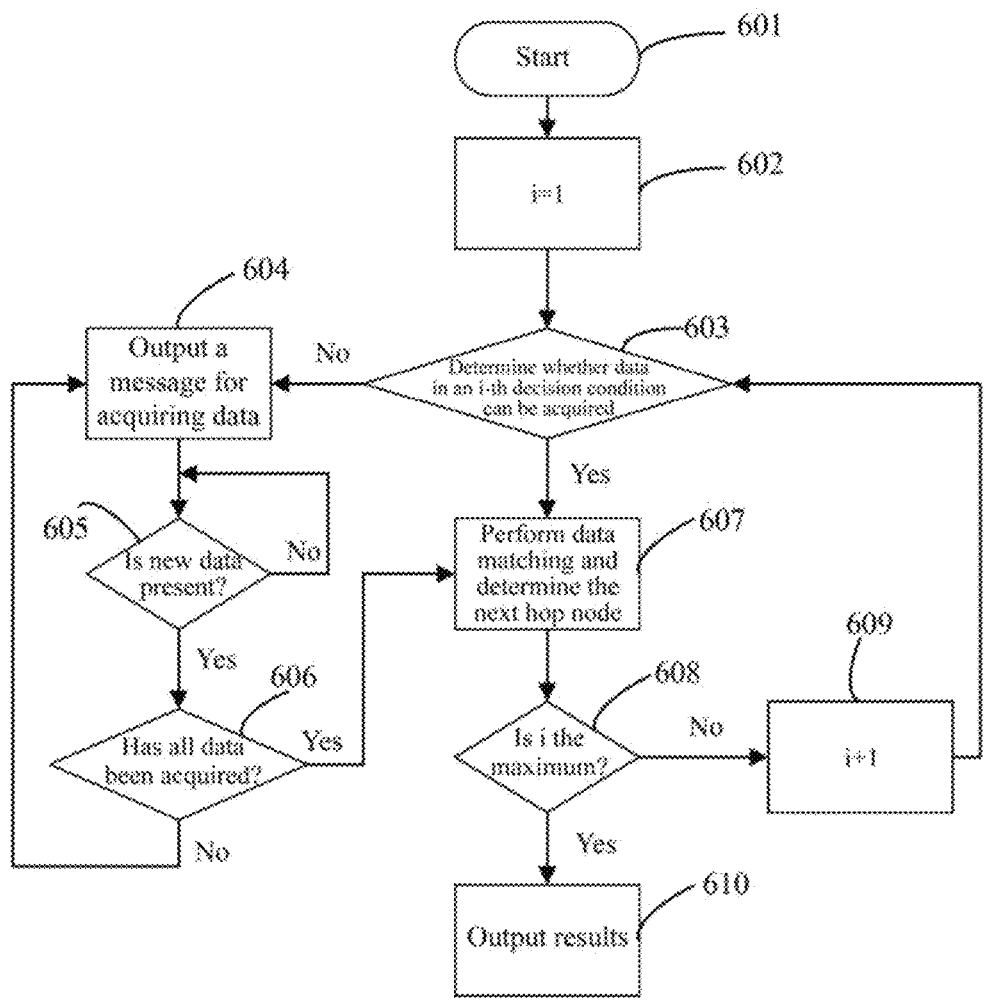
FIG. 6 is a schematic diagram of a portion of the process of an ultrasound imaging method of an embodiment of the present application.
Figure 7:
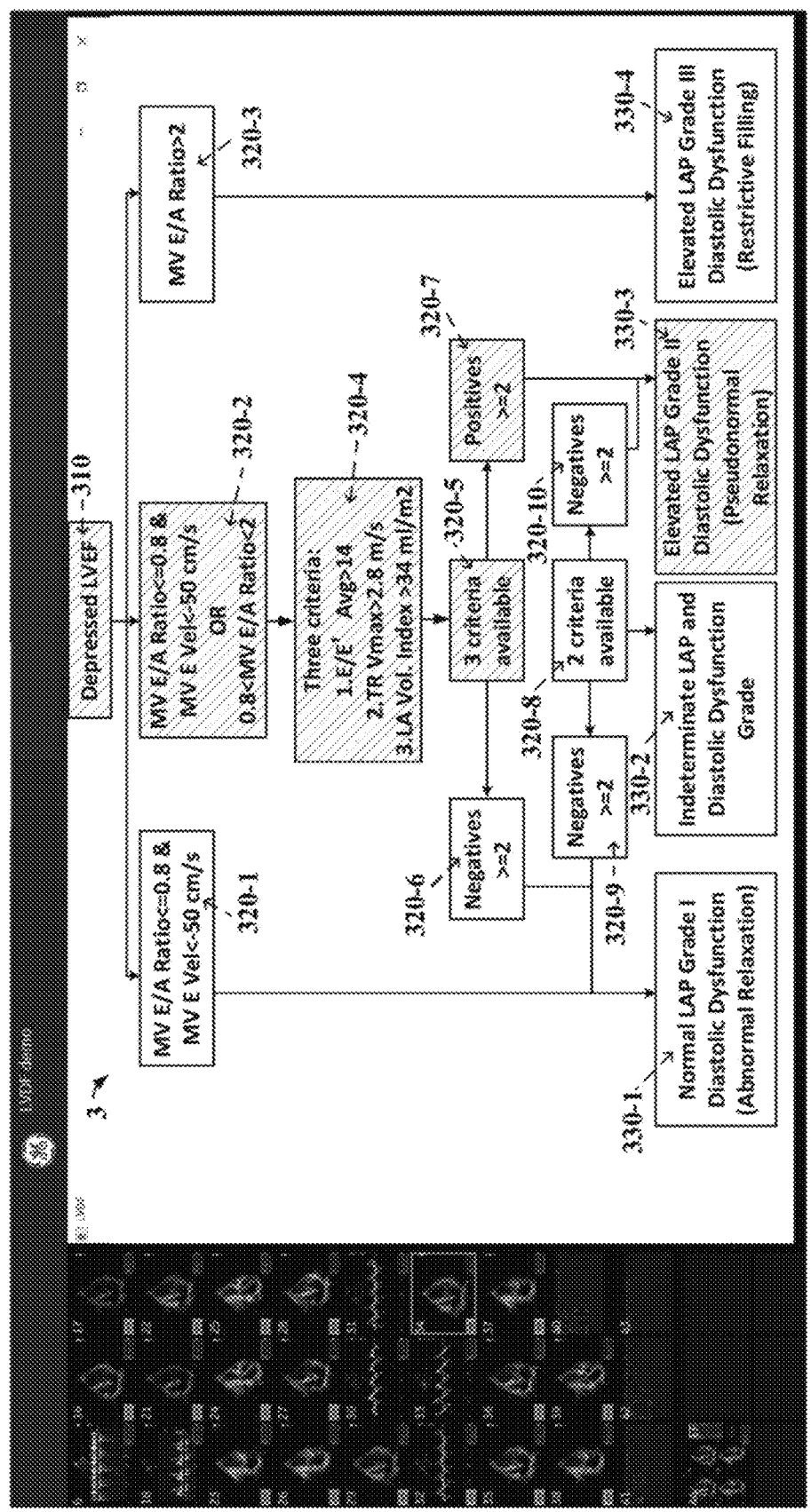
FIG. 7 is another schematic diagram of aiding a physician in performing an ultrasound scan by utilizing a decision tree for left ventricle diastolic function.

FIG. 6 is a schematic diagram of a portion of the process of an ultrasound imaging method of an embodiment of the present application, and FIG. 7 is another schematic diagram of aiding a physician in performing an ultrasound scan by utilizing a decision tree for left ventricle diastolic function.

The process of obtaining new parameter measurement results during a decision tree matching process is illustrated below by using FIG. 6 as an example.

In some embodiments, as shown in FIG. 6, the process 600 may include:
  601: Starting matching;
  602: Initializing the decision condition number i;
  603: Determining whether all data required in a current decision condition already exists; if "yes," proceeding to 607, and if "no," proceeding to 604;
  604: Outputting an alert message indicating the acquisition of the required data;
  605: Determining whether new data is stored; if "yes," proceeding to 606, and if "no," continuing to wait;
  606: Determining whether all required data has been obtained; if "yes," proceeding to 607, and if "no," returning to 604;
  607: Matching the current decision condition according to existing data, and deciding the next hop node according to the matching results;

608: Determining whether the current decision condition is a final decision condition; if "yes," proceeding to 610, and if "no," proceeding to 609;

609: Moving to the next decision condition, and returning to 603;

610: Outputting the matching results.

In the above example, the number of decision conditions i may be the number of all decision conditions in a link or the number of decision conditions in a particular node. The alert message in step 604 may be a message that is highlighted by controlling a display device. The next hop node in step 607 may be an internal node or a leaf node. The final decision condition in step 608 can be the last decision condition in the end-most node in a link (which can be a root node or an internal node), or can be the last decision condition among the decision conditions contained in a particular node.

The matching results in step 610 may be an entire link from the root node 310 passing through the internal nodes 320-2, 320-4, 320-5, 320-7 to the leaf node 330-3 as shown in FIG. 7, or may be the highlighting of a particular matching node, or may be a diagnostic result corresponding to a leaf node.

The implementation of each of the above steps may be correspondingly carried out according to actual needs. References can also be made to the foregoing embodiments, but the embodiments of the present application are not limited thereto.

Such a configuration can provide aid in many different ultrasound diagnostic scenarios. For example, in one scenario, current ultrasound images and measurement results thereof have covered an entire link. At this time, the solutions of the present application can directly provide a physician with a specific diagnosis. In conjunction with the remaining embodiments of the present application, each matched node may also be highlighted, allowing the physician to clearly understand how the results were generated, thereby increasing work efficiency while increasing scan and examination confidence. Alternatively, in another scenario, a physician is guided by an embodiment of the present application to progressively perform ultrasound imaging and measurements, at which time the solution of the present application can match in real time updated data with decision conditions of a node until a particular link is completed.

In embodiments of the present application, the ultrasound images and parameter measurements may be carried out in real time, i.e., the method of embodiments of the present application may be embedded into the process of an ultrasound scan, e.g., displaying a button for starting a decision tree in an interface associated with the ultrasound scan, and displaying a button for returning to the ultrasound scan in an interface that displays the decision tree.

For example, in operation 102, a first button is displayed in a first interface associated with the real-time ultrasound imaging, the first button being capable of being triggered and used to open a second interface containing the decision tree; and in response to the first button being triggered, the second interface is displayed.

In some embodiments, the second interface further includes:

A minimization button capable of being triggered to minimize the second interface and a maximization button capable of being triggered to maximize the second interface.

In some embodiments, the method may further include:

In response to the minimization button being triggered, minimizing and displaying the second interface in a way in which at least a portion of the first interface is not obscured; and Maximizing and displaying the second interface in response to the maximization button being triggered.

In some embodiments, the second interface is overlappingly displayed on the first interface.

With such an implementation, the maximized second interface helps a physician to carefully observe each decision detail in the decision tree and determine the progress of a current link. The minimized second interface is configured such that the same does not obscure the first interface, which in turn can help the physician to perform imaging or measurement in the next step after observing the decision tree without adding too much workflow.

In some other embodiments, the second interface and the first interface are displayed on different display devices. For example, on an ultrasound machine equipped with two display devices, a primary interface may be used to display the first interface, and a secondary interface (e.g., on a touch screen of the ultrasound machine) may be used to display the second interface. For example, the first interface and the second interface may be arranged up and down, allowing the physician to refer to the decision tree while performing real-time imaging or measurements. In such a configuration manner, the physician does not have to manipulate the decision tree, and real-time imaging guidance is faster and more efficient.

Figure 8:
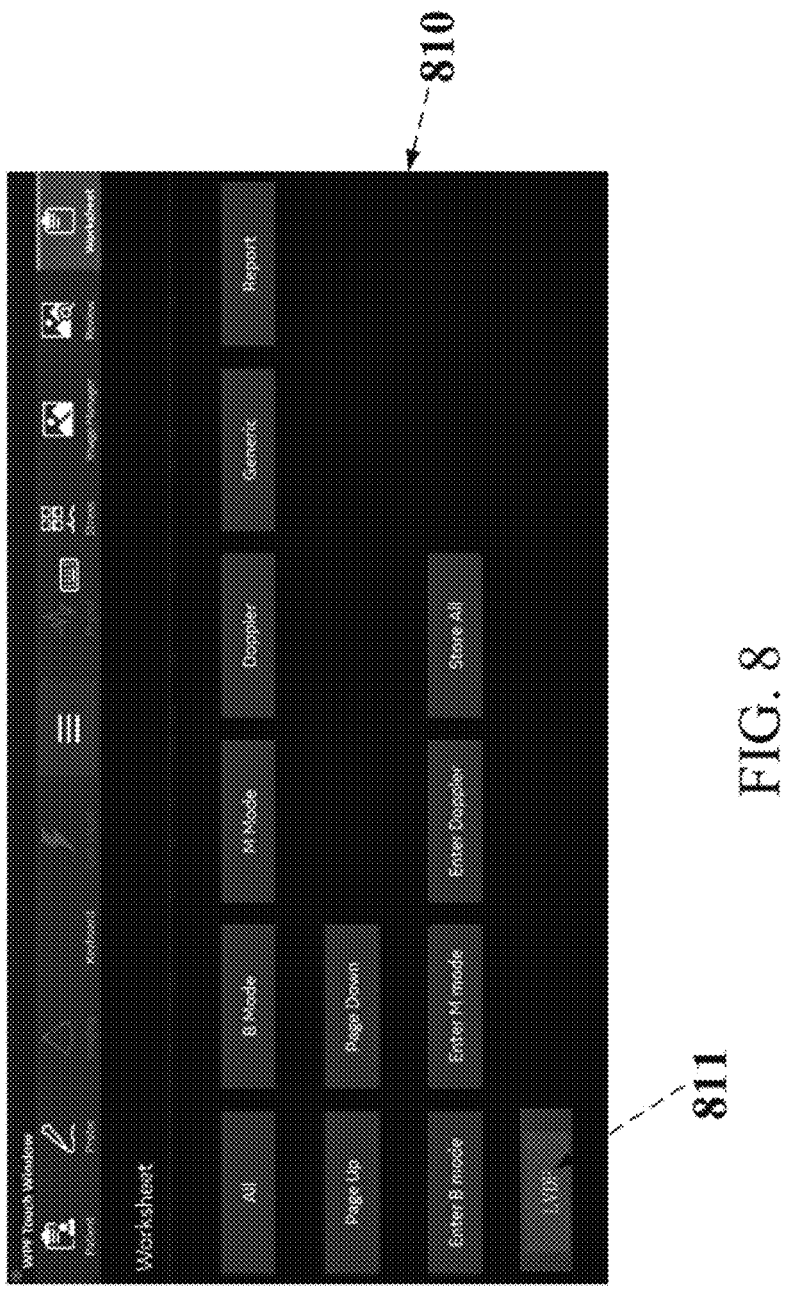
FIG. 8 is a schematic diagram of an embodiment of the present application displaying a first button in a first interface.
Figure 9:
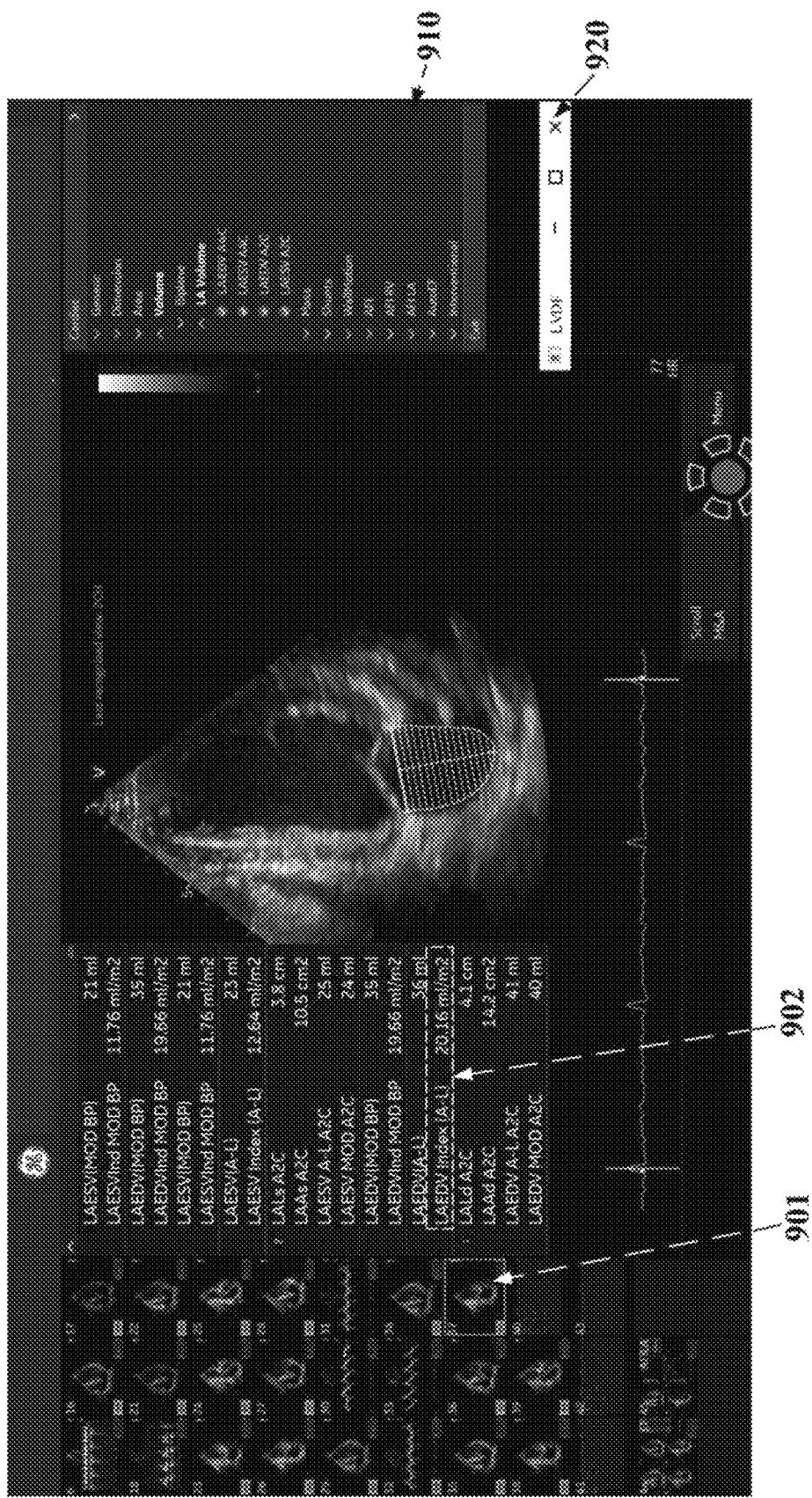
FIG. 9 is a schematic diagram of performing real-time parameter measurements in the method according to an embodiment of the present application.

FIG. 8 is a schematic diagram of an embodiment of the present application displaying a first button in a first interface, and FIG. 9 is a schematic diagram of performing real-time parameter measurements in the method according to an embodiment of the present application.

The method for displaying the first interface and the second interface is described below by using FIGS. 3, 4, 8 and 9 as examples.

As shown in FIG. 8, the first interface 810 is an interface related to real-time ultrasound imaging, e.g., an interface that displays a worksheet, wherein a first button 811 is displayed in the first interface 810, the first button 811 is a button for displaying a decision tree, and once the button is triggered, for example, a second interface 300 shown in FIG. 3 can be displayed. Additionally, the first interface 810 may, for example, be an interface for performing real-time ultrasound scanning, such as a first interface 910 shown in FIG. 9.

As shown in FIG. 3, a minimization button 301 may be included in the second interface 300, and the second interface 300 is minimized and displayed once the minimization button 301 is triggered, e.g., as shown in FIG. 9, the second interface is displayed and minimized as a bar-shaped interface 920, hence an area of the first interface 910 in which valid information is displayed can be left unobstructed. Valid information includes, for example, ultrasound scan images, information lists, parameter measurement screens, etc.

As shown in FIG. 3, a maximization button 302 may also be included in the second interface 300, wherein the second interface 300 is enlarged and displayed once the maximization button 302 is triggered, for example, the second interface 300 is displayed at the largest size that the display device is capable of displaying, or the display of the second interface 300 is restored when the display size of the second interface 300 is minimized.

As shown in FIG. 3, the second interface 300 may be overlappingly displayed on the first interface 910. Additionally, the second interface 300 and the first interface 910 may be displayed on different display devices, e.g., when an ultrasound scan system is configured with a primary display and a secondary display, the first interface 910 may be displayed on the primary display and the second interface 300 may be displayed on the secondary display.

In embodiments of the present application, as shown in FIG. 3, the second interface 300 may further include an exit button 303, and in response to the exit button 303 being triggered, the display of the second interface 300 is withdrawn from the first interface 910, i.e., the second interface 300 is not displayed in the first interface 910.

In the above example, for instance, if a node to be matched 320-4 is present in the LVDF decision tree 3 as shown in FIG. 3, i.e., there are scan images and/or parameter measurements that need to be supplemented, then an operator of an ultrasound scan may trigger the minimization button 301 to minimize the second interface 300 and thus expose the first interface 910, for example as shown in FIG. 9, and then perform a real-time ultrasound scan or a real-time parameter measurement in the first interface 910 to obtain a new scan image 901 or a new parameter measurement 902, and then the operator may trigger the maximization button on the bar-shaped second interface 920 to return to the display of the second interface 300 shown in FIG. 3.

Additionally, in the example of FIG. 4, when the scan image and/or parameter measurement to be supplemented is displayed in the pop-up window 410, a confirmation button 401 may be displayed on the pop-up window 410, and in response to the confirmation button 401 being triggered, a display screen shown in FIG. 3 may be returned to, or a display screen shown in FIG. 9 may be displayed.

As can be seen from the above embodiments, automatically matching according to the ultrasound images and parameter measurement results and the decision conditions of the decision tree and displaying the matching results can aid physicians in performing ultrasound scans or measurements and reduce the diagnostic burden of the physicians.

Figure 10:
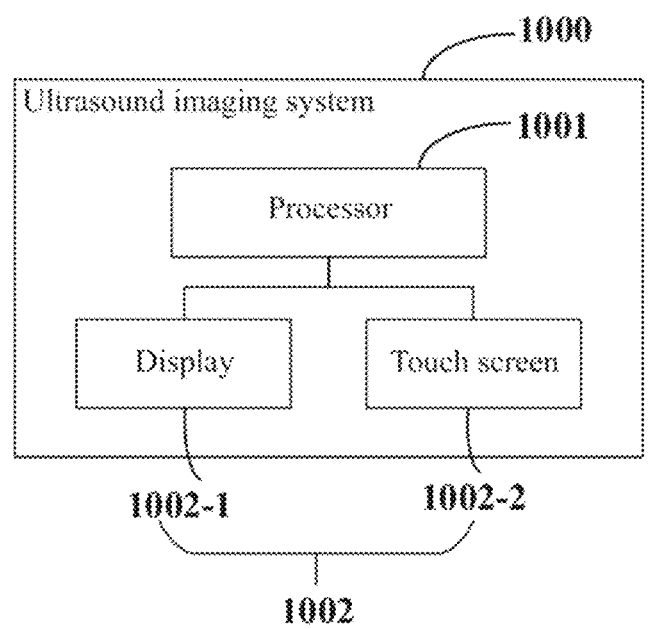
FIG. 10 is a block diagram of an ultrasound imaging system of an embodiment of the present application.

Embodiments of the present application further provide an ultrasound imaging system, and FIG. 10 is a block diagram of an ultrasound imaging system of an embodiment of the present application.

As shown in FIG. 10, the ultrasound imaging system 1000 includes a processor 1001, the processor 1001 performing the steps of the ultrasound imaging method described in the above embodiments.

In some embodiments, as shown in FIG. 10, the ultrasound imaging system 1000 may further include a display device 1002 that receives instructions from the processor 1001 to display a corresponding interface. The display device 1002 can be implemented with reference to relevant technology, and the embodiments of the present application are not limited thereto.

In some embodiments, as shown in FIG. 10, the display device 1002 may include two display devices 1002-1 and 1002-2, the display device 1002-2 being, for example, a touch screen.

In addition, the ultrasound imaging system 1000 may further include a detector/probe, cable, and the like that are not shown in the figure, relevant technology can be referred to for details, and the embodiments of the present application are not limited thereto.

Embodiments of the present application further provide a computer-readable program, wherein upon execution of the program, the program causes a computer to perform the ultrasound imaging method described in the preceding embodiments in an ultrasound imaging device or ultrasound imaging system.

Embodiments of the present application further provide a non-transitory computer-readable storage medium, which is used for storing a computer program, wherein the computer program, when executed by a computer, enables the computer to perform the ultrasound imaging method described in the preceding embodiments.

The above embodiments merely provide illustrative descriptions of the embodiments of the present application. However, the present application is not limited thereto, and appropriate variations may be made on the basis of the above embodiments. For example, each of the above embodiments may be used independently, or one or more among the above embodiments may be combined.

The present application is described above with reference to specific embodiments. However, it should be clear to those skilled in the art that the foregoing description is merely illustrative and is not intended to limit the scope of protection of the present application. Various variations and modifications may be made by those skilled in the art according to the spirit and principle of the present application, and these variations and modifications also fall within the scope of the present application.

Preferred embodiments of the present application are described above with reference to the accompanying drawings. Many features and advantages of the implementations are clear according to the detailed description, and therefore the appended claims are intended to cover all these features and advantages that fall within the true spirit and scope of these implementations. In addition, as many modifications and changes could be easily conceived of by those skilled in the art, the embodiments of the present application are not limited to the illustrated and described precise structures and operations, but can encompass all appropriate modifications, changes, and equivalents that fall within the scope of the implementations.

The invention claimed is:

1. An ultrasound imaging method, comprising:
   performing real-time ultrasound imaging of tissue to be imaged;
   generate a series of ultrasound images and parameter measurement results;
   displaying a decision tree regarding the tissue to be imaged, the decision tree comprising nodes, the nodes comprising a root node, a plurality of internal nodes, and a plurality of leaf nodes, the root node and each internal node comprising at least one decision condition, respectively, the root node linking separately to each of the plurality of leaf nodes by means of a predetermined number of internal nodes to form a plurality of links, the predetermined number being determined by the decision conditions, and each of the plurality of leaf nodes corresponding to a diagnostic result, respectively;
   automatically matching the parameter measurement results with each of the nodes according to the at least one decision condition; and
   automatically updating the display of the decision tree according to the results of the automatic matching.

2. The method according to claim 1, wherein automatically updating the display of the decision tree according to the results of the automatic matching comprises:
   highlighting, in a first manner, at least one node that matches the parameter measurement results; and/or
   highlighting, in a second manner, a node to be matched, wherein the node to be matched links to an end node among the at least one node and does not match the parameter measurement results.

3. The method according to claim 2, wherein automatically updating the display of the decision tree according to the results of the automatic matching further comprises:
displaying an alert message regarding the node to be matched, the alert message comprising information regarding parameter measurements required to match with the node to be matched.

4. The method according to claim 1, wherein the method further comprises:
acquiring new parameter measurement results;
performing new automatic matching of the new parameter measurement results; and
automatically updating the display of the decision tree according to the results of the new automatic matching.

5. The method according to claim 1, wherein:
the tissue to be imaged comprises a heart, and the diagnostic results relate to left ventricular diastolic function.

6. The method according to claim 1, wherein displaying a decision tree regarding the tissue to be imaged comprises:
displaying a first button in a first interface associated with the real-time ultrasound imaging, the first button being capable of being triggered to open a second interface containing the decision tree; and
displaying the second interface in response to the first button being triggered.

7. The method according to claim 6, wherein the second interface further comprises:
a minimization button capable of being triggered to minimize the second interface and a maximization button capable of being triggered to maximize the second interface.

8. The method according to claim 7, wherein the method further comprises:
in response to the minimization button being triggered, displaying the second interface in a reduced manner in which at least a portion of the first interface is not blocked; and
in response to the maximization button being triggered, displaying the second interface in a maximized manner.

9. The method according to claim 6, wherein:
the second interface is overlappingly displayed on the first interface; or,
the second interface and the first interface are displayed on different display devices.

10. An ultrasound imaging system, comprising:
a memory storing instructions; and
a processor configured to execute the instructions to:
perform real-time ultrasound imaging of tissue to be imaged;
generate a series of ultrasound images and parameter measurement results;
display a decision tree regarding the tissue to be imaged, the decision tree comprising nodes, the nodes comprising a root node, a plurality of internal nodes, and a plurality of leaf nodes, the root node and each internal node comprising at least one decision condition, respectively, the root node linking separately to each of the plurality of leaf nodes by means of a predetermined number of internal nodes to form a plurality of links, the predetermined number being determined by the decision conditions, and each of the plurality of leaf nodes corresponding to a diagnostic result, respectively;
automatically match the parameter measurement results with each of the nodes according to the at least one decision condition; and
automatically update the display of the decision tree according to the results of the automatic matching.

11. The system according to claim 10, wherein the ultrasound imaging system further comprises a display device, the display device receiving instructions from the processor to then display a corresponding interface.

12. The system according to claim 11, wherein the display device comprises two display devices, one of which is a touch screen.

13. The system according to claim 11, wherein automatically updating the display of the decision tree according to the results of the automatic matching comprises:
highlighting, in a first manner, at least one node that matches the parameter measurement results; and/or
highlighting, in a second manner, a node to be matched, wherein the node to be matched links to an end node among the at least one node and does not match the parameter measurement results.

14. The system according to claim 13, wherein automatically updating the display of the decision tree according to the results of the automatic matching further comprises:
displaying an alert message regarding the node to be matched, the alert message comprising information regarding parameter measurements required to match with the node to be matched.

15. The system according to claim 11, wherein displaying a decision tree regarding the tissue to be imaged comprises:
displaying a first button in a first interface associated with the real-time ultrasound imaging, the first button being capable of being triggered to open a second interface containing the decision tree; and
displaying the second interface in response to the first button being triggered.

16. A non-transitory computer-readable storage medium for storing a computer program that, when executed by a computer, causes the computer to execute the method:
performing real-time ultrasound imaging of tissue to be imaged;
generate a series of ultrasound images and parameter measurement results;
displaying a decision tree regarding the tissue to be imaged, the decision tree comprising nodes, the nodes comprising a root node, a plurality of internal nodes, and a plurality of leaf nodes, the root node and each internal node comprising at least one decision condition, respectively, the root node linking separately to each of the plurality of leaf nodes by means of a predetermined number of internal nodes to form a plurality of links, the predetermined number being determined by the decision conditions, and each of the plurality of leaf nodes corresponding to a diagnostic result, respectively;
automatically matching the parameter measurement results with each of the nodes according to the at least one decision condition; and
automatically updating the display of the decision tree according to the results of the automatic matching.

17. The method according to 16, wherein automatically updating the display of the decision tree according to the results of the automatic matching comprises:
highlighting, in a first manner, at least one node that matches the parameter measurement results; and/or
highlighting, in a second manner, a node to be matched, wherein the node to be matched links to an end node among the at least one node and does not match the parameter measurement results.

18. The method according to claim 16, wherein automatically updating the display of the decision tree according to the results of the automatic matching further comprises:
   displaying an alert message regarding the node to be matched, the alert message comprising information regarding parameter measurements required to match with the node to be matched.

19. The method according to claim 16, wherein displaying a decision tree regarding the tissue to be imaged comprises:
   displaying a first button in a first interface associated with the real-time ultrasound imaging, the first button being capable of being triggered to open a second interface containing the decision tree; and
   displaying the second interface in response to the first button being triggered.

20. The method according to claim 16, wherein the method further comprises:
   acquiring new parameter measurement results;
   performing new automatic matching of the new parameter measurement results; and
   automatically updating the display of the decision tree according to the results of the new automatic matching.

21. The method according to claim 16, wherein the tissue to be imaged comprises a heart, and the diagnostic results relate to left ventricular diastolic function.

* * * * *